United States Patent
Ban et al.

(10) Patent No.: US 7,202,957 B2
(45) Date of Patent: Apr. 10, 2007

(54) THREE-DIMENSIONAL VISUAL SENSOR (75) Inventors: Kazunori Ban, Yamanashi (JP); Ichiro Kanno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 180 days.

(21) Appl. No.: 11/037,330

(22) Filed: Jan. 19, 2005

(65) Prior Publication Data
US 2005/0162420 A1 Jul. 28, 2005

(30) Foreign Application Priority Data
Jan. 19, 2004 (JP) .............................. 2004-010786

(51) Int. Cl.
*G01B 11/24* (2006.01)
(52) U.S. Cl. ..................... 356/603; 356/622
(58) Field of Classification Search ........ 356/601–624; 382/153–154; 700/245, 259; 250/559.22, 250/669.19, 559.19
See application file for complete search history.

(56) References Cited

U.S. PATENT DOCUMENTS

| 5,129,010 | A | | 7/1992 | Higuchi et al. | |
|---|---|---|---|---|---|
| 5,461,478 | A | * | 10/1995 | Sakakibara et al. ......... | 356/623 |
| 6,049,385 | A | * | 4/2000 | Norita et al. ............... | 356/613 |
| 6,798,527 | B2 | * | 9/2004 | Fukumoto et al. .......... | 356/602 |
| 7,084,989 | B2 | * | 8/2006 | Johannesson et al. ....... | 356/601 |
| 2002/0005956 | A1 | * | 1/2002 | Kiyoi ......................... | 356/601 |
| 2003/0090483 | A1 | * | 5/2003 | Watanabe et al. ........... | 345/419 |
| 2004/0080758 | A1 | * | 4/2004 | Ban et al. ................... | 356/603 |
| 2004/0081352 | A1 | * | 4/2004 | Ban et al. ................... | 382/154 |
| 2005/0084149 | A1 | * | 4/2005 | Aizawa et al. .............. | 382/154 |
| 2006/0023938 | A1 | * | 2/2006 | Ban et al. ................... | 382/153 |
| 2006/0074526 | A1 | * | 4/2006 | Watanabe et al. ........... | 700/245 |

FOREIGN PATENT DOCUMENTS

| EP | 1 215 017 A2 | 6/2002 |
|---|---|---|
| EP | 1 413 850 A2 | 4/2004 |
| JP | 6-258024 | 9/1994 |
| JP | 10-063317 | 3/1998 |
| JP | 10-105717 | 4/1998 |

OTHER PUBLICATIONS

* European Search Report.
* cited by examiner

*Primary Examiner*—Hoa Q. Pham
(74) *Attorney, Agent, or Firm*—Drinker Biddle & Reath LLP (57) ABSTRACT

A three-dimensional visual sensor is disclosed. A two-dimensional image of a two-dimensional feature portion including a point determined on a work is acquired, and N points are determined. A slit of light is projected by a projector, an image of a projected portion is obtained, and M points are determined. The three-dimensional position of the intersection point between each straight line connecting the N points and a point in a camera and the slit of light plane is determined on the sensor coordinate system, and transformed to the data on the reference coordinate system. The three-dimensional positions of M points are similarly subjected to coordinate transform to the data on the reference coordinate system. Straight lines defined by the M and N points are determined. The intersection point between the two straight lines is determined and returned to the data on the sensor coordinate system by inverse transform.

3 Claims, 8 Drawing Sheets

THREE-DIMENSIONAL VISUAL SENSOR

BACKGROUND OF THE INVENTION

1. Field of the Invention

The present invention relates to a three-dimensional visual sensor or, in particular, to a three-dimensional visual sensor for radiating a spot of light or a slit of light on the surface of an object and for measuring the three-dimensional position of specific points on the object. The three-dimensional visual sensor according to the invention is used for various applications and in combination with a robot, for example.

2. Description of the Related Art

A conventional method of determining the three-dimensional position of an object to be measured is known. In the method several end points of the object are determined by use of a spot of light (hereinafter referred to also as "a pseudo-slit of light") or a slit of light scanned in planar form, as described in (i) and (ii) below.

(i) Two or more slit of light beams are projected into a hole formed in a given flat metal plate, and at least three end points are detected thereby to determine the three-dimensional position and the direction of the surfaces of the hole. This method is disclosed, for example, in Japanese Unexamined Patent Publication No. 6-258024.

(ii) Template matching is conducted using a scanned spot of light (pseudo-slit of light) or a slit of light with the shape of the lights on an image as a template. In this way, the scanned spot of light or the slit of light is specified, and the three-dimensional position of the detected points included therein are determined. This method is disclosed, for example, in Japanese Unexamined Patent Publication No. 10-105717.

Various methods of calibration are well known for a three-dimensional visual sensor used to measure the three-dimensional position of a specified point of an object by radiating the spot of light or the slit of light on the surface of the object. One of the methods is disclosed, for example, in Japanese Unexamined Patent Publication No. 10-063317.

In the method (i) described above, the higher the measurement accuracy, the higher the accuracy at which the portion where the hole crosses the slit of light or the pseudo-slit of light formed by the scanning spot of light is detected. The portion where the hole and the slit of light cross each other, however, is actually where it is most difficult to specify the slit of light. Although some improvement is expected by elaborate design efforts, therefore, it is difficult to accurately specify the slit of light. Also, depending on the surface condition or the color of the object, the intersection point is often blurred and invisible or develops a halation to an indistinguishable degree.

In the method (ii), on the other hand, template matching is conducted on an image. Depending on the color or the surface condition of the object, however, the slit line is thickened or blurred. Even in the case where the center of the slit of light is accurately defined, an image of a different shape from the template model is often formed, with the result that steady detection is difficult. Further, the portion near the end of the image is easily affected by lens distortion. The employment of a lens having a long focal length to avoid this inconvenience would lead to the problem that the visual field is so narrow that even a slight displacement of the object makes the slit of light invisible.

Accordingly, the object of this invention is to solve the problem of the related art described above. Specifically, this invention is intended to improve the three-dimensional visual sensor for measuring the three-dimensional position of a specific point of an object by radiating the spot of light or the slit of light on the surface of the object. Even in a case where accurate measurement of a three-dimensional position is difficult in the related art, this invention makes it possible to determine the three-dimensional position of a feature point on a reference light plane.

SUMMARY OF THE INVENTION

According to this invention, the above-mentioned problem is solved by a three-dimensional visual sensor using the reference light (the slit of light or the pseudo-slit of light formed by scanning a spot of light) projected in planar form, wherein the three-dimensional positions of a plurality of points determined on a robot coordinate system or a coordinate system unique to a sensor are projected on a coordinate system associated with a reference light plane, and a feature point is determined on the coordinate system where the light is projected. Then, the position of the feature point thus determined is transformed to the robot coordinate system or the coordinate system unique to the sensor.

More specifically, according to a first aspect of the invention, there is provided a three-dimensional visual sensor comprising a first image pickup means for picking up the spot of light or the slit of light radiated as reference light on the surface of an object to be measured, and a means for detecting the three-dimensional position at which the reference light enters the surface of the object based on the incident point of the reference light and the direction in which the reference light is radiated on the acquired image. This invention has the features described below.

A three-dimensional visual sensor according to the invention comprises:

a means for detecting a plurality of three-dimensional positions on a intersection line between a reference light plane constituting a plane formed at the time of scanning the spot of light or a plane containing the slit of light and the surface of an object to be measured, the three-dimensional positions being required to specify the shape of the intersection line, and determining the intersection line on a three-dimensional orthogonal coordinate system set in such a manner that the plane formed by two of three coordinate axes is coincident or parallel with the reference light plane;

a means for detecting the position on an image plane of a feature line of the object of measurement from the image of the object picked up by a second image pickup means;

a means for projecting the feature line of the image plane on the reference light plane by projection transform and determining the projected feature line on the three-dimensional orthogonal coordinate system;

a means for determining the intersection point between the intersection line and the projection feature line as a coordinate value on the three-dimensional orthogonal coordinate system; and a means for transforming the coordinate value of the determined intersection point into a three-dimensional coordinate value on at least one of the coordinate system set in the robot and the coordinate system set in the three-dimensional visual sensor.

As described in the second aspect of the invention, the first image pickup means can also serve as the second image pickup means.

According to a third aspect of the invention, there is provided a three-dimensional visual sensor using template matching, comprising an image pickup means for picking up an image of the spot of light or the slit of light radiated as reference light on the surface of an object to be measured, and a means for detecting the three-dimensional position at which the reference light enters the surface of the object, based on the point at which the reference light enters the picked-up image and the direction in which the reference light is radiated on the picked-up image.

The three-dimensional visual sensor according to this aspect of the invention further comprises:

a means for detecting a plurality of three-dimensional positions on a intersection line between a reference light plane constituting a plane formed at the time of scanning the spot of light or a plane containing the slit of light and the surface of an object to be measured, the three-dimensional positions being required to specify the shape of the intersection line, and determining the intersection line on a three-dimensional orthogonal coordinate system set in such a manner that the plane formed by two of three coordinate axes is coincident or parallel with the reference plane;

a means for specifying a detection point on the intersection line by matching a prepared template of a geometric intersection line pattern with the intersection line determined on the three-dimensional orthogonal coordinate system and determining the detection point in terms of the coordinate value on the three-dimensional orthogonal coordinate system; and a means for transforming the coordinate value of the intersection point determined above into the three-dimensional coordinate value on at least selected one of the coordinate system set in the robot and the coordinate system set in the three-dimensional visual sensor.

In the three-dimensional visual sensor according to this invention, the three-dimensional position is determined in the robot coordinate system and the sensor coordinate system for each point on a work or the like object irradiated with the reference light in planar form. Next, the coordinate system on which the three-dimensional position is determined is transformed to the coordinate system associated with the reference light plane. In accordance with this coordinate transform, the three-dimensional position is transformed. Using the positional information after transform, the position of the feature point to be acquired on the coordinate system after transform is determined. In the process, the well-known template matching method may be used. This position is further transformed into the original coordinate system. As a result, the three-dimensional position of the feature point on the planar reference light is determined.

Even in a case where the three-dimensional position cannot be measured accurately according to the related art, this invention makes it possible to accurately determine the three-dimensional position of a feature point on the planar reference light, thereby improving the measurement accuracy and the reliability of the three-dimensional visual sensor.

DETAILED DESCRIPTION OF THE INVENTION

Figure 1:
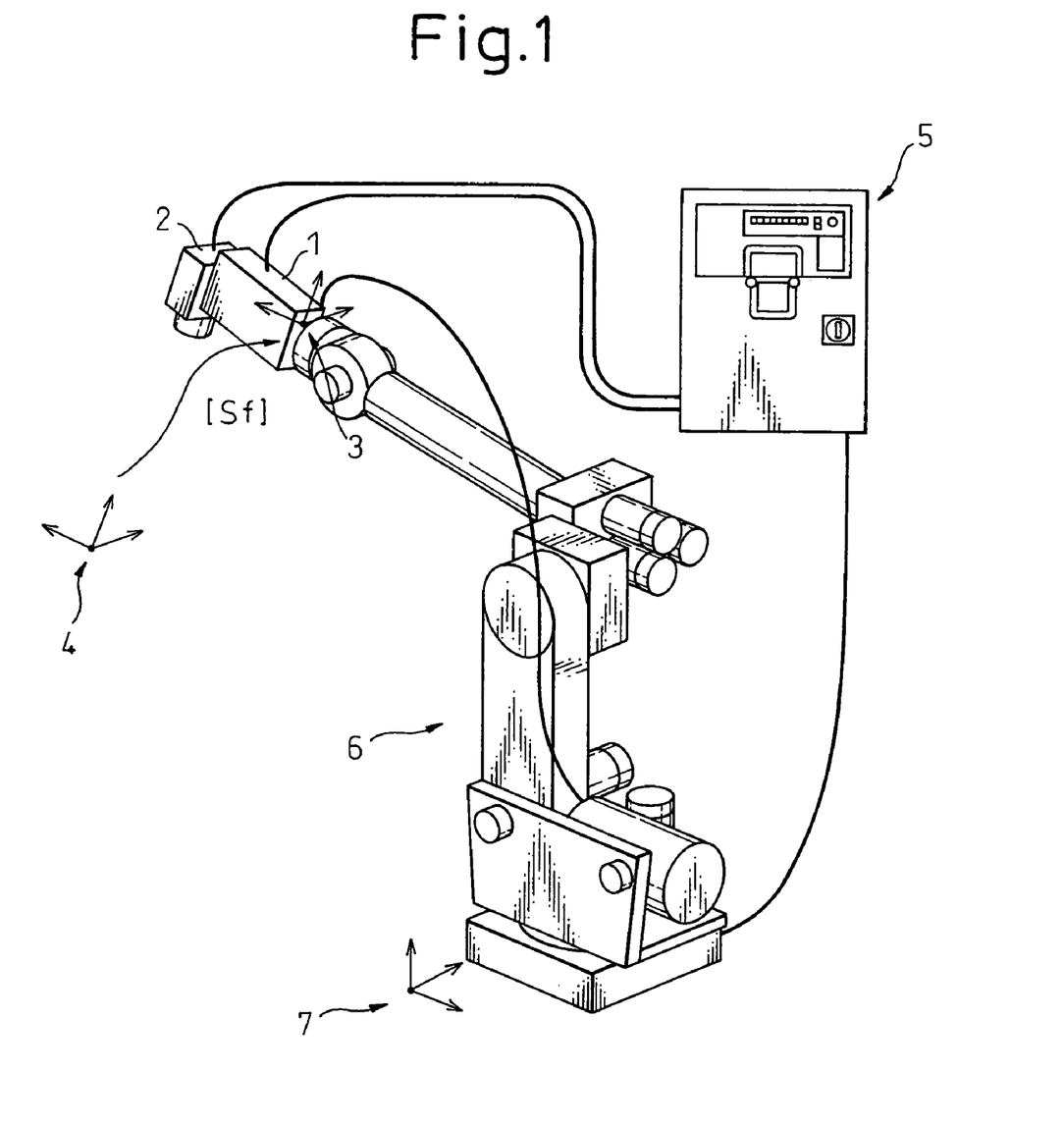
FIG. 1 is a diagram showing a general configuration employed according to an embodiment of the invention.

Embodiments of the invention are explained below with reference to the drawings. First, FIG. 1 is a figure showing a general configuration employed in an embodiment of the invention. The sensor head of a three-dimensional visual sensor includes a projector 1 for projecting the slit of light or the pseudo-slit of light as a reference light and a video camera 2 for receiving the projected reference light. The video camera 2 is used not only as a receiver to detect the reflected reference light but also to determine the two-dimensional feature amount of the object to be measured. As described above, the "pseudo-slit of light" herein is defined as the pseudo-slit of light formed by a spot of light scanned in planar form. The plane carrying the slit of light or the plane carrying the projected spot of light beam for spot of light scanning constitutes the "reference light plane". In the description that follows, unless otherwise specified, the wording "slit of light" is used as an expression including also the "pseudo-slit of light".

Reference numeral 6 designates a robot connected to and controlled in a well-known way by a robot controller 5. As shown in FIG. 1, the three-dimensional visual sensor (i.e. "sensor head" as the same applies hereinafter) is mounted at the forward end (face plate) of the robot 6. The robot controller 5, which also serves as an image processor/controller of the visual sensor, is connected to the projector 1 and the video camera 2. The robot controller 5 controls the projection operation of the projector 1 and the image pickup operation of the video camera 2 on the one hand, while at the same time grabbing and processing the image and executing the various processes described later.

The robot 6 has a unique coordinate system (hereinafter referred to as "the robot coordinate system") 7. Also, a coordinate system (hereinafter referred to as "the face plate coordinate system") 3 is set fixedly on the face plate of the robot 6. The face plate coordinate system 3 is related to the robot coordinate system, and has the data (matrix data) thereof stored in the internal memory of the robot controller 5. Further, the well-known calibration of the three-dimensional visual sensor is already completed, and the various data (calibration data) obtained by the calibration are stored in the internal memory of the robot controller 5.

The calibration data include the data for determining by calculation where the slit of light projected by the projector 1 forms a plane (reference light plane) in the space and the direction in which the optical axis of the video camera 2 is directed. At the same time, a coordinate system (hereinafter referred to as "the sensor coordinate system") 4 unique to the visual sensor is set. The face plate coordinate system 3 and the sensor coordinate system 4 are related to each other by a transform matrix [Sf], and the data of the transform matrix

[Sf] are also stored in the internal memory of the robot controller 5. A concrete method of calibration and the contents of the data are well known, while the method of determining the transform matrix [Sf] is disclosed in Japanese Unexamined Patent Publication No. 10-063317.

Figure 2:
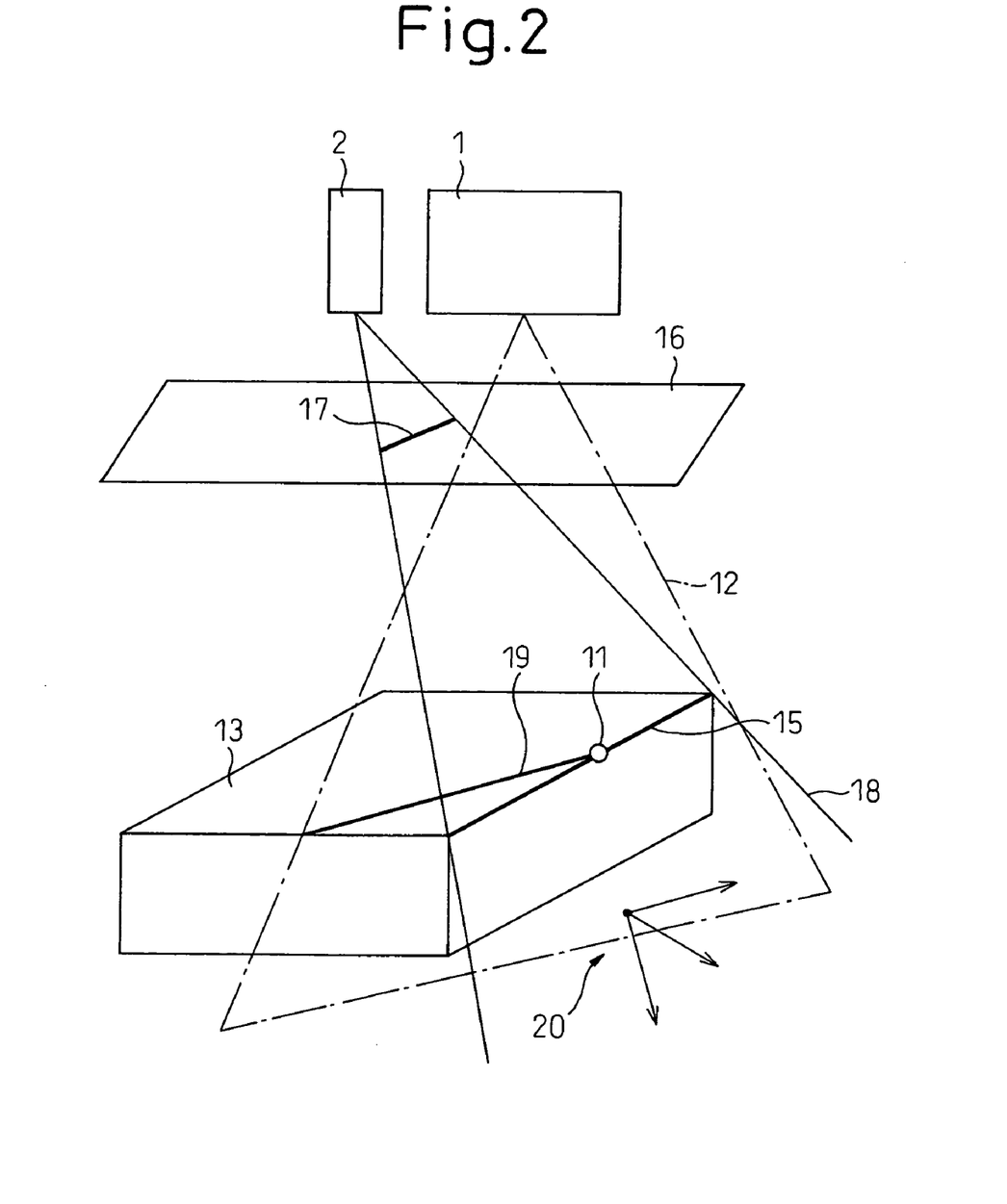
FIG. 2 is a diagram showing an example of an application according to an embodiment.

FIG. 2 shows an application of the system of FIG. 1 in which an instruction is issued from the robot controller 5, and the slit of light (which, as described above, may be the pseudo-slit of light formed of the scanning spot of light) 12 is radiated on the object of measurement (a parallelopipedal work in this case) 13 by the projector 1 thereby to determine the three-dimensional position of the intersection point 11 of the slit of light 12 and a side 15 of the work 13. A method of determining the three-dimensional position of the intersection point 11 accurately according to this embodiment is described below.

Upon radiation of the slit of light 12 on the work 13, the portion 19 radiated by the slit of light is made brighter than the other portions. The slit of light 12 is planar, and therefore, the projected portion 19 should ideally assume a clear bright line (which may be a pseudo-bright dotted line in the case of the pseudo-slit of light as the same applies hereinafter) having a predetermined line width. In actual cases, however, the line width may become irregular or an unclear shade may appear in a part of the projected portion 19 or especially the neighborhood of the intersection point 11 depending on the surface conditions or color of the work 13, as described above.

Specifically, in a case other than the extreme case where the whole projected portion 19 is unclear, the three-dimensional position of each of many points can be determined on the sensor coordinate system. In the case where the line width irregularities or the unclear shading appears in the neighborhood of the intersection point 11, however, the accurate position of the intersection point 11 cannot be determined, which leads to the disadvantage of the related art.

According to this embodiment, the three-dimensional position of each point making up the projected portion 19 on the sensor coordinate system is provisionally transformed to the coordinate of the three-dimensional position on the reference coordinate system with an X-Y plane set in the plane of the slit of light 12. If the transform matrix representing this coordinate transform is [T], the data [T] of the transform matrix can be determined from the data on the plane carrying the slit of light forming the projected portion 19 and the set data of the sensor coordinate system. The determination in the direction of X axis and Y axis of the reference coordinate system leaves some freedom. Nevertheless, the direction in which the X axis (or Y axis) of the sensor coordinate system is projected on the reference plane can be used as the X axis (or Y axis) of the reference coordinate system.

If the three-dimensional position of each point Pn on the projected portion 19 on the sensor coordinate system is (xn, yn, zn) and the three-dimensional position thereof on the reference coordinate system is (Xn, Yn, Zn), the projection of each point Pn is located on the reference plane (plane of the slit of light 12), and therefore Zn should be zero. Thus, the three-dimensional position (Xn, Yn, 0) on the reference coordinate system can be processed actually as two-dimensional information. In this case, the reference coordinate system is set in such a manner that the X-Y plane coincides with the plane of the slit of light 12. As an alternative, however, the reference coordinate system can be set in such a manner that the plane formed by two axes such as the X-Y plane of each coordinate system is parallel with the plane of the slit of light 12. In such a case, the plane of the slit of light 12 assumes the value Zn=Z0 (Z0: constant) at each point and (Xn, Yn, 0) is replaced with (Xn, Yn, Z0) on the reference coordinate system. Nevertheless, the value Zn remains constant, and therefore these points can still be processed as two-dimensional information.

The intersection point 11 to be determined is both a point on the portion 19 where the slit of light 12 is radiated on the work 13 and a point on the side 15 of the work 13 at the same time. The side 15 of the work 13 can be caught as a line segment (line image) by the normal image pickup function (two-dimensional image acquisition function or capturing function) of the video camera 2 and the image processing function of the visual sensor. This process is shown by the line segment (line image) 17 on the image plane 16 in FIG. 2. The side 15 of the work 13 is contained on the plane 18 including the line segment 17 and one point (normally, the lens center the position of which is determined by calibration) in the video camera 2.

Figure 3:
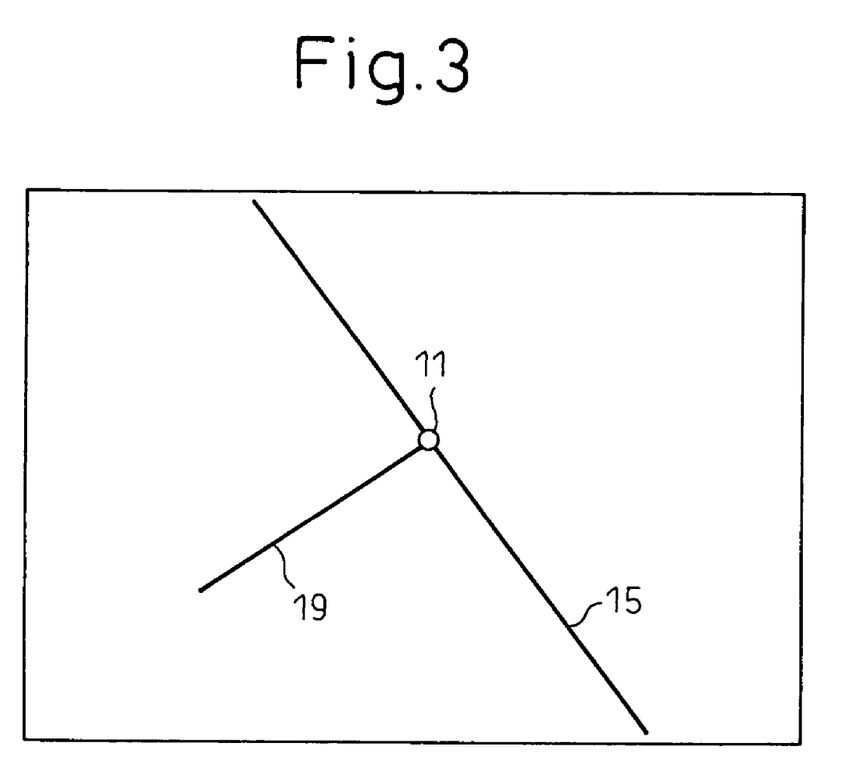
FIG. 3 is a diagram showing the relation between the projected portion 19 of a work 13 irradiated with slit of light 12 and one side 15 of the work 13 in the X-Y plane of the reference coordinate system in FIG. 2.

Regarding the intersection line between the plane 18 and the plane of the slit of light 12 (expressed as Z=0 on the reference coordinate system), FIG. 3 shows the relation between the projected portion 19 where the slit of light 12 is radiated on the work 13 and the side 15 of the work 13. Since the work is parallelopipedal, both the portion 19 where the slit of light 12 is radiated on the work 13 and the side 15 of the work 13 are projected as a straight line. Thus, the intersection point between the straight lines is determined. In the actual method, an equation indicating the straight line corresponding to the projected portion 19 and an equation indicating the straight line corresponding to the side 15 are determined by the least squares method or a similar well-known method, and the intersection point (Xq, Yq, 0) is calculated, where (Xq, Yq, 0) is the coordinate value on the reference coordinate system.

Figure 4:
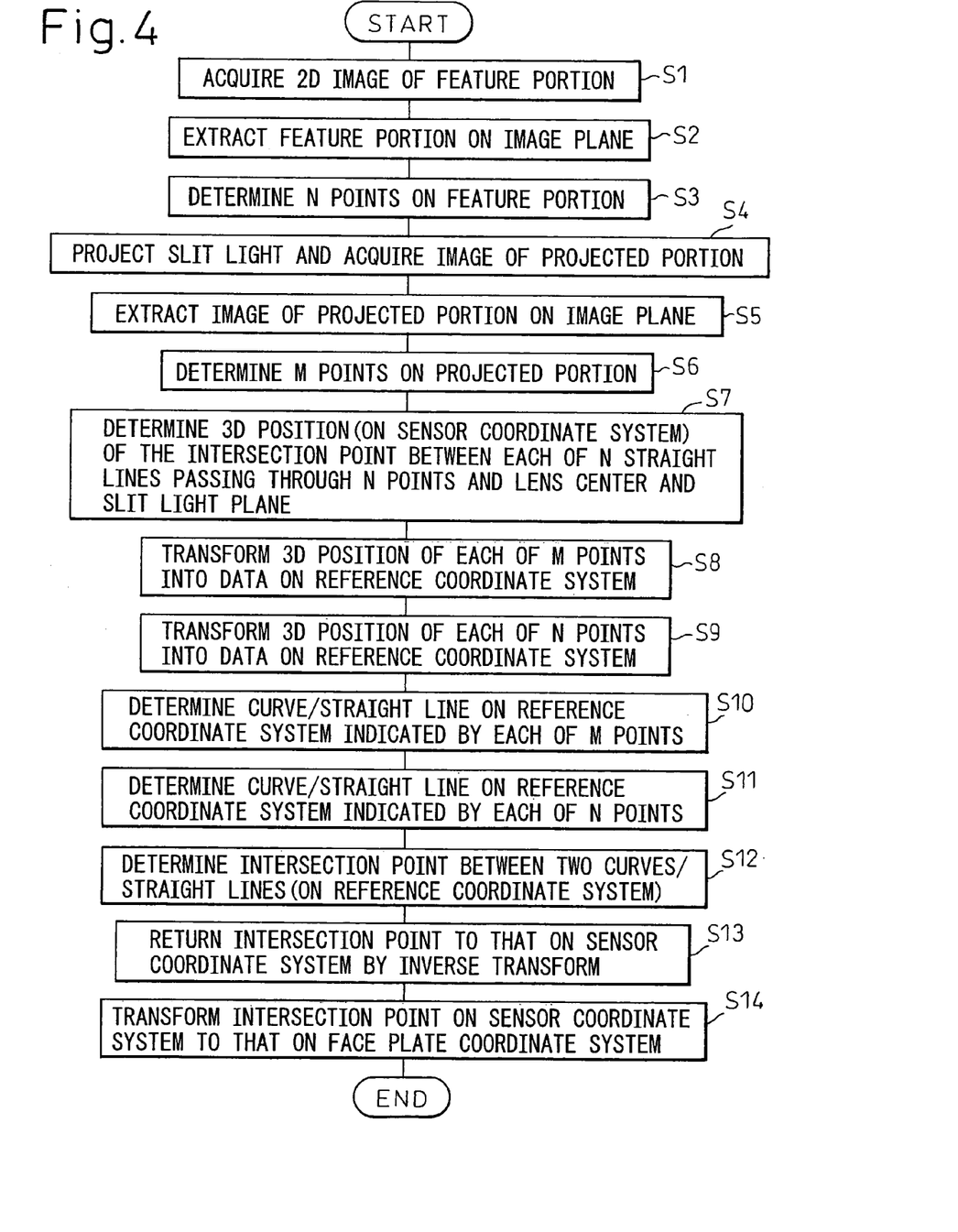
FIG. 4 is a flowchart schematically showing the steps executed according to an embodiment in the application shown in FIG. 2.

Suppose that the work surface or one side of the work is curved. A curved line instead of a straight line is projected. In such case, a similar process can be executed by determining these curves in terms of as a function using the well-known method of approximating, for example, the polynomial curve or the spline curve by the least squares method. The position of the intersection point (value on the reference coordinate system) determined in this way is subjected to the inverse transform (expressed as the inverse matrix Inv[T] of the matrix [T]) of the above-mentioned transform (expressed as the matrix [T]). Thus, the three-dimensional position on the original sensor coordinate system can be determined. Also, the three-dimensional position on the sensor coordinate system can be transformed to the data on the robot coordinate system using the transform matrix [Sf] described above. FIG. 4 summarizes these processes as a flowchart of steps briefly described below.

Step S1: An instruction to perform normal image pickup operation is sent from the robot controller 5 to the video camera 2, and a two-dimensional image having a two-dimensional feature portion such as a straight line containing a point to be determined on the work (generally, an object to be measured, as the same applies hereinafter) 13 is acquired.

Step S2: A two-dimensional feature portion is extracted on the image plane by processing the image in the robot controller 5.

Step S3: Points in the number N (N≧2 and set at, for example, about several tens in advance) are determined according to an appropriate rule from the feature portion (one side, for example) on the extracted image plane. For example, N points are selected at equal intervals from the pixels corresponding to the feature portion.

Step S4: A light projection instruction is sent from the robot controller 5 to the projector 1, while sending an instruction to the video camera 2 to pick up the image of the slit of light at the same time. Thus, an image containing the projected portion 19 is acquired.

Step S5: The projected portion 19 is extracted on the image plane by processing the image in the robot controller 5.

Step S6: Points in the number M (M≧2 and set at, for example, about several tens in advance) are determined according to an appropriate rule from the image of the projected portion 19 extracted at step S4. For example, M points are selected at equal intervals from the pixels corresponding to the projected portion.

Step S7: The three-dimensional position of each of (N) intersection points between each of (N) straight lines connecting each of (N) points selected at step S3 and one point (lens center, for example) in the video camera 2, and the plane of the slit of light (slit plane) projected at step S4, is determined on the sensor coordinate system.

Step S8: The three-dimensional position (on the sensor coordinate system) of each of M points selected at step S6 is transformed into the data on the reference coordinate system (set on the slit plane or parallel to the same plane) using the coordinate transform matrix [T].

Step S9: The three-dimensional position (on the sensor coordinate system) of each of N points determined at step S7 is transformed into the data on the reference coordinate system (set on the slit plane or parallel to the same plane) using the coordinate transform matrix [T].

Step S10: Based on the result obtained at step S8, a curve (or a straight line in some cases) expressed by the M points on the reference plane is determined by a well-known approximation method such as the least squares method.

Step S11: Based on the result obtained at step S9, a curve (or a straight line in some cases) expressed by the N points on the reference plane is determined by a well-known approximation method such as the least squares method.

Step S12: The intersection point between the curves (or the straight lines) determined at steps S10 and S11 is determined on the reference coordinate system.

Step S13: The intersection point determined at step S12 is subjected to the inverse transform expressed by the inverse matrix Inv[T] of [T] thereby to determine a intersection point on the sensor coordinate system.

Step S14: The intersection point determined at step S13 is subjected to the transform expressed by the matrix [Sf] thereby to determine a intersection point on the face plate coordinate system. If necessary, this data is further transformed into the data on the robot coordinate system.

By executing these steps, the three-dimensional position of the intersection point 11 (FIG. 2) can be accurately determined. The feature of this process lies in that the intersection point 11 itself (the corresponding pixel) may not be contained in the image (the pixel) of the projected portion 19 extracted at step S5 or the points selected at step S6. In other words, as long as the curve (or the straight line) is accurately determined as a whole at step S10, the three-dimensional position of the intersection point 11 is not reduced in accuracy in the image of the projected portion 19. This advantage is not obtained by the related art.

Figure 5:
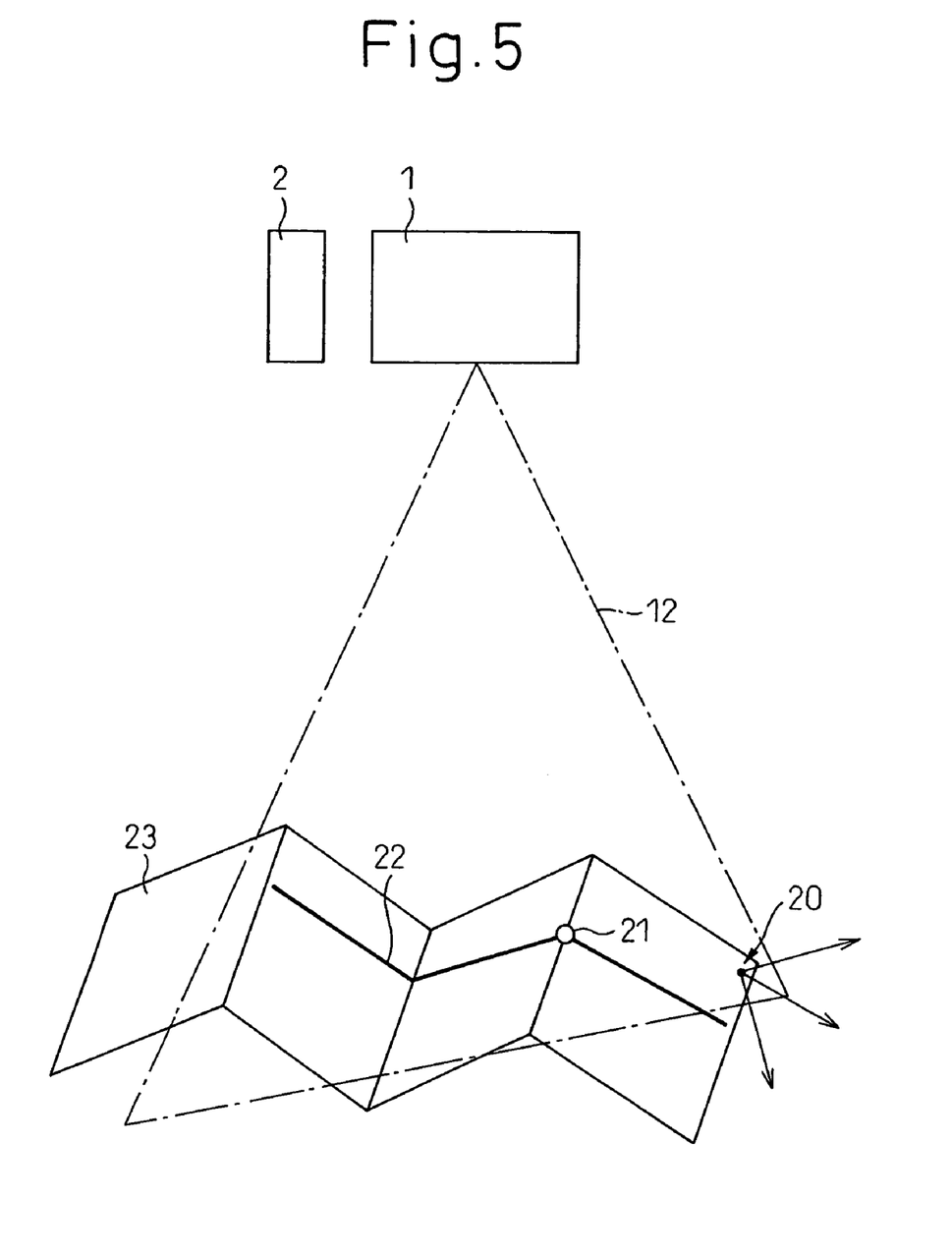
FIG. 5 is a diagram showing another example of an application according to an embodiment.

Next, another application of the invention as shown in FIG. 5 is explained. This application represents a case in which the three-dimensional position of a convex point 21 of a stepped work 23 is determined. First, an appropriate work is prepared as a typical object to be measured and, as in the case described above, the three-dimensional position of each arbitrary point where the projected portion 22 of the work 23 is irradiated with the slit of light 12 is determined on the sensor coordinate system 4. This position is transformed to the three-dimensional position on the reference coordinate system by the coordinate transform (matrix [T]) in the same way as in the aforementioned case.

Figure 6:
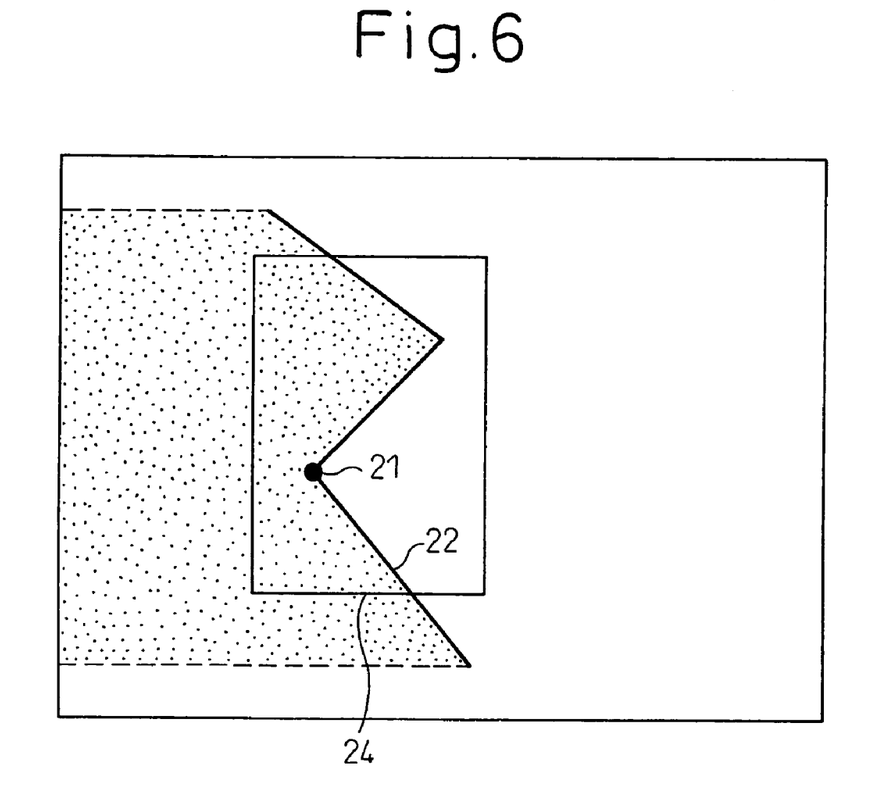
FIG. 6 is a schematic diagram for explaining the application shown in FIG. 5.

As a result, the values of X and Y at each point are plotted on the X-Y plane of the reference coordinate system, and if necessary, connected with each other to form an image. An example is shown in FIG. 6. In this case, the right and left parts are illustrated with different brightness to facilitate the understanding of the points plotted and connected as a boundary. In FIG. 6, the shape including the feature point to be determined is registered (taught) as a model image 24 beforehand in the robot controller 5. The model image 24 is used as a template for detecting the feature portion (the convex portion in this case) at the time of subsequent measurement. Specifically, in each subsequent process, a corresponding image is prepared using the input image of each work to be measured, and images having the same shape are recognized by use of the well-known model matching technique such as the normalized correlationship thereby to detect (recognize or specify) the feature point 21.

The three-dimensional position (on the reference coordinate system) of the detected feature point 21 is subjected to inverse transform (Inv[T]) to determine the three-dimensional position of the feature point 21 on the original sensor coordinate system 4.

Figure 7:
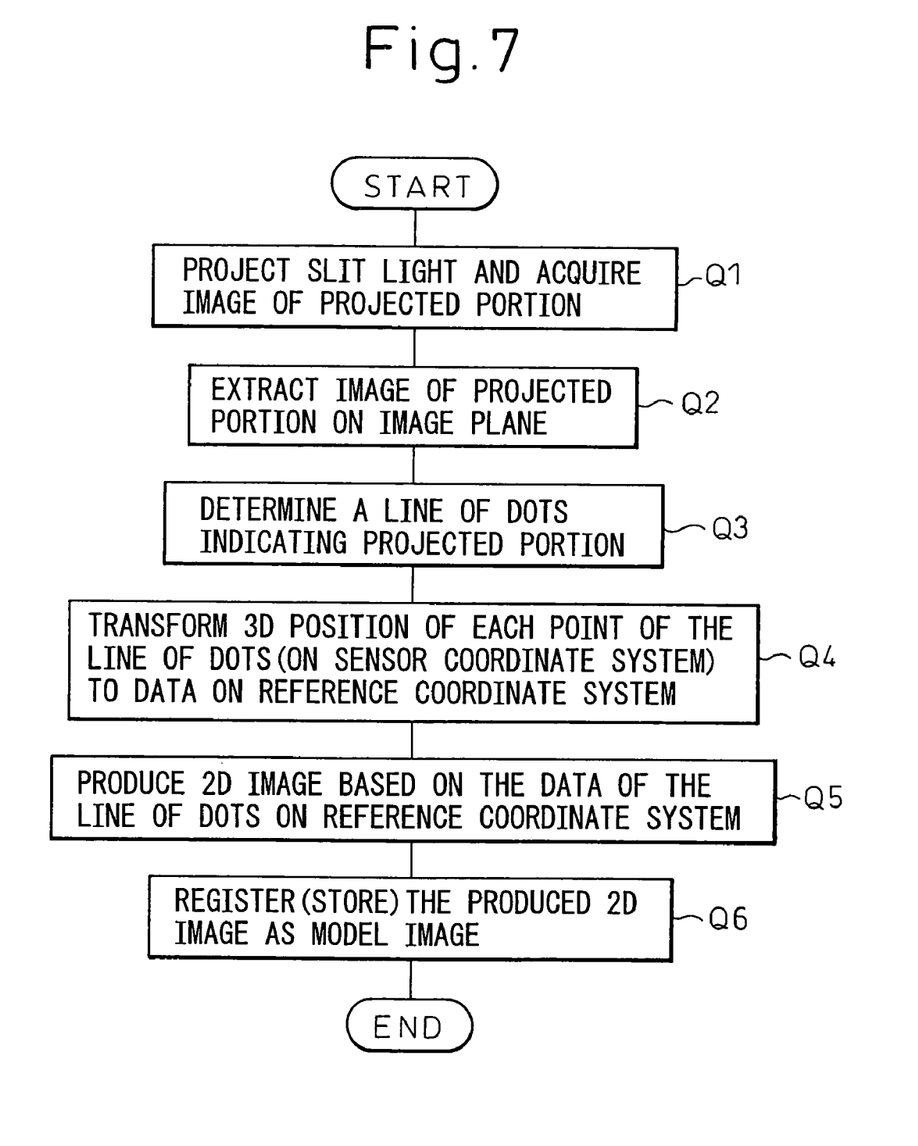
FIG. 7 is a flowchart schematically showing the teaching (model registration) steps executed according to an embodiment for the application of FIG. 5.
Figure 8:
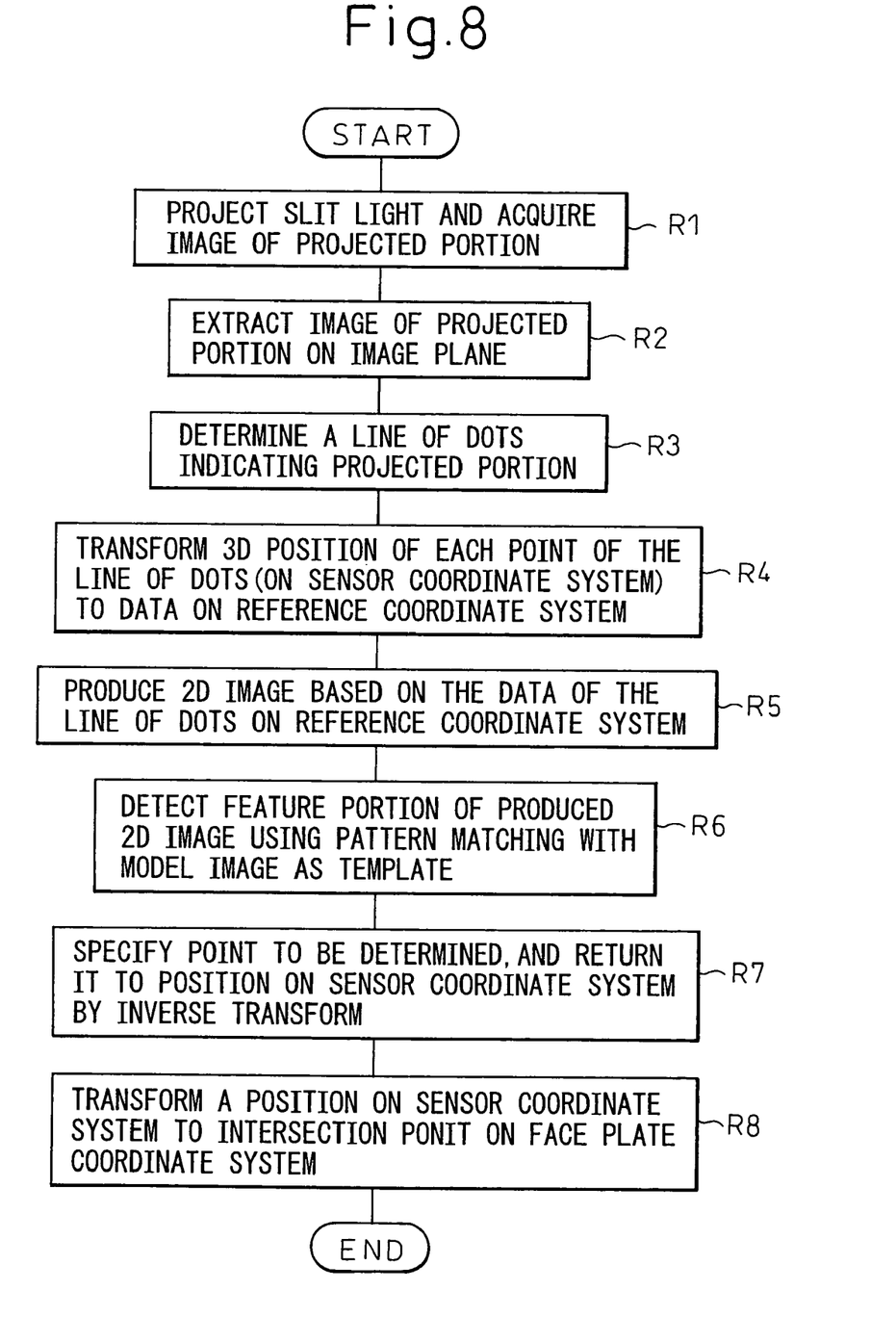
FIG. 8 is a flowchart schematically showing the measurement steps executed according to an embodiment for the application shown n FIG. 5.

FIGS. 7 and 8 are a summarization of this process in a flowchart divided into "teaching (model registration)" and "measurement". Each step is briefly described below.

[Teaching (Model Registration)] (FIG. 7)

Step Q1: A projection instruction is sent to the projector 1 from the robot controller 5 to project the slit of light in such a manner as to pass through the convex point 21 of the work used for teaching. At the same time, an instruction to pick up an image of the slit of light is sent to the video camera 2 to acquire an image containing the projected portion 22.

Step Q2: The projected portion 22 is extracted on the image plane by processing the image in the robot controller 5.

Step Q3: The appropriate number (about 100, for example) of line of dots is determined to express the image of the projected portion 22 extracted at step Q2.

Step Q4: The three-dimensional position (on the sensor coordinate system) of the line of dots determined at step Q3 is transformed to the data on the reference coordinate system (set on the slit plane or in parallel to the same plane) using the coordinate transform matrix [T].

Step Q5: A two-dimensional image is produced based on the line of dots obtained at step Q4. If necessary, the line of dots are connected or the brightness is differentiated between the two areas divided by the connected line.

Step Q6: The two-dimensional image produced at step Q5 is stored as a model image in the memory of the robot controller 5 thereby to end the process.

[Measurement] (FIG. 8)

Step R1: A projection instruction is sent to the projector 1 from the robot controller 5 to project the slit of light in such a manner as to pass through the convex point 21 of the work to be measured. At the same time, an instruction to pick up an image of the slit of light is sent to the video camera 2 to acquire an image containing the projected portion 22.

Step R2: The projected portion 22 is extracted on the image plane by processing the image in the robot controller 5.

Step R3: The appropriate number (about 100, for example) of line of dots are determined to express the image of the projected portion 22 extracted at step R2.

Step R4: The three-dimensional position (on the sensor coordinate system) of the line of dots determined at step R3 is transformed to the data on the reference coordinate system (set on the slit plane or in parallel to the same plane) using the coordinate transform matrix [T].

Step R5: A two-dimensional image is produced based on the line of dots obtained at step R4. If necessary, the line of dots are connected, the brightness is differentiated between the two areas divided by the connected line or a similar process is executed to the one for producing the model image.

Step R6: The model image taught is used as a template, and by pattern matching with the two-dimensional image produced at step R5, the feature portion (convex portion having the point 21) is recognized.

Step R7: The point 21 is specified, and the three-dimensional position on the reference coordinate system is subjected to the inverse transform (Inv[T]) to determine the three-dimensional position on the sensor coordinate system.

Step R8: The position determined at step R7 is subjected to the transform expressed by matrix [Sf] to determine the intersection point on the face plate coordinate system. If necessary, the intersection point is further transformed into the data on the robot coordinate system.

By executing the steps described above, the three-dimensional position of the point 21 (FIG. 5) on the convex portion can be accurately obtained. The feature of this process lies in that the image (pixel) of the projected portion 22 extracted at steps Q2, R2 may not include the point 21 itself (corresponding pixel). In other words, as long as the two-dimensional image produced at steps Q5, R5 as a whole can be accurately determined, the three-dimensional position of point 21 is not reduced in accuracy. This advantage cannot be obtained by the related art.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A three-dimensional visual sensor comprising:
a means for detecting the three-dimensional position at which a reference light constituted of a selected one of a spot of light and a slit of light hits the surface of an object to be measured, based on the incident position and the direction of radiation of the reference light on the image, acquired by a first image pickup means, of the reference light radiated on the surface of the object;
a means for detecting a plurality of three-dimensional positions on an intersection line between a selected one of the plane formed at the time of scanning the spot of light and a reference light plane containing the slit of light on the one hand and the surface of the object to be measured on the other hand, the plurality of the three-dimensional positions being required to specify the shape of the intersection line, and determining the intersection line on a three-dimensional orthogonal coordinate system set so that the plane formed by two of the three coordinate axes is coincident or parallel with the reference light plane;
a means for detecting the position on an image plane of a feature line of the object from the image of the object acquired by a second image pickup means;
a means for projecting the feature line of the image plane on the reference light plane by projection transform and determining the projected feature line on the three-dimensional orthogonal coordinate system;
a means for determining the intersection point between the intersection line and the projected feature line on the three-dimensional orthogonal coordinate system; and
a means for transforming the coordinate value of the determined intersection point into a three-dimensional coordinate value on at least one of the coordinate system set in a robot and the coordinate system set in a three-dimensional visual sensor.

2. A three-dimensional visual sensor according to claim 1, wherein said first image pickup means serves as said second image pickup means.

3. A three-dimensional visual sensor used for template matching, comprising:
a means for detecting the three-dimensional position at which a reference light constituted of a selected one of the spot of light and the slit of light enters the surface of an object to be measured, based on the incident position and the direction of radiation of the reference light on the image, acquired by a first image pickup means, of the reference light radiated on the surface of the object;
a means for detecting a plurality of three-dimensional positions on an intersection line between a selected one of the plane formed at the time of scanning the spot of light and a reference light plane containing the slit of light on the one hand and the surface of the object to be measured on the other hand, the plurality of the three-dimensional positions being required to specify the shape of the intersection line, and determining the intersection line on a three-dimensional orthogonal coordinate system set so that the plane formed by two of the three coordinate axes is coincident or parallel with the reference light plane;
a means for specifying a point of detection on said intersection line by matching a prepared template of a geometric pattern of the intersection line with the intersection line determined on the three-dimensional orthogonal coordinate system, and determining said detection point in terms of the coordinate value on the three-dimensional orthogonal coordinate system; and
a means for transforming the coordinate value of the determined detection point into a three-dimensional coordinate value on at least selected one of the coordinate system set in a robot and the coordinate system set in a three-dimensional visual sensor.

* * * * *